(12) United States Patent
Monegan et al.

(10) Patent No.: US 9,124,694 B2
(45) Date of Patent: Sep. 1, 2015

(54) METHOD AND APPARATUS FOR INTENT PREDICTION AND PROACTIVE SERVICE OFFERING

(71) Applicant: 24/7 CUSTOMER, INC., Campbell, CA (US)

(72) Inventors: Michael Monegan, Los Osos, CA (US); Samrat Baul, Union City, CA (US)

(73) Assignee: 24/7 Customer, Inc., Campbell, CA (US)

( * ) Notice: Subject to any disclaimer, the term of this patent is extended or adjusted under 35 U.S.C. 154(b) by 0 days.

(21) Appl. No.: 13/961,675

(22) Filed: Aug. 7, 2013

(65) Prior Publication Data

US 2014/0044243 A1 Feb. 13, 2014

Related U.S. Application Data

(60) Provisional application No. 61/680,957, filed on Aug. 8, 2012.

(51) Int. Cl.
*H04M 3/00* (2006.01)
*H04M 3/493* (2006.01)
(52) U.S. Cl.
CPC .................................... *H04M 3/493* (2013.01)

(58) Field of Classification Search
CPC . H04M 3/493; H04M 3/4931; H04M 3/4933; H04M 3/4935; H04M 3/4936; H04M 3/4938
USPC .............. 379/88.01, 266.08, 265.13; 705/304
See application file for complete search history.

(56) References Cited

U.S. PATENT DOCUMENTS

| 8,488,774 | B2 * | 7/2013 | Mahalaha et al. | ....... 379/265.13 |
| 2007/0127635 | A1 | 6/2007 | Zellner et al. | |
| 2007/0198368 | A1 | 8/2007 | Kannan et al. | |
| 2010/0138282 | A1 | 6/2010 | Kannan et al. | |
| 2010/0191658 | A1 * | 7/2010 | Kannan et al. | ................ 705/304 |
| 2013/0156170 | A1 * | 6/2013 | Springer | .................... 379/88.22 |

FOREIGN PATENT DOCUMENTS

WO WO-2013090492 A1 6/2013

* cited by examiner

*Primary Examiner* — Fan Tsang
*Assistant Examiner* — Van D Huynh
(74) *Attorney, Agent, or Firm* — Michael A. Glenn; Perkins Coie LLP

(57) ABSTRACT

An intelligent IVR system identifies a customer based on previous customer interactions. Customer intent is predicted for an ongoing interaction and personalized services are proactively offered to the customer. A self-optimizing algorithm improves intent prediction, customer identity, and customer willingness to engage and use IVR.

28 Claims, 4 Drawing Sheets

METHOD AND APPARATUS FOR INTENT PREDICTION AND PROACTIVE SERVICE OFFERING

CROSS REFERENCE TO RELATED APPLICATIONS

This application claims priority to U.S. provisional patent application Ser. No. 61/680,957, filed Aug. 8, 2012 which application is incorporated herein in its entirety by this reference thereto.

BACKGROUND OF THE INVENTION

1. Technical Field

The invention relates to field of Interactive Voice Response (IVR) technology. More particularly, the invention relates to intelligent IVR Systems having predictive technology that enhances the customer experience.

2. Description of the Background Art

Interactive voice response (IVR) technology is deployed between a customer and a customer care executive to automate the process of serving the customer at least in part. IVR systems are often criticized as being unhelpful and difficult to use due to their poor design and the fact that they tend to show a lack of appreciation of the customer's needs.

A properly designed IVR system should connect customers to their desired service promptly and with minimum complexity. Present IVR technology handles all customers in a "one size fits all" manner, taking the customer through a series of menus before arriving at the desired service. This makes the call time-consuming, which leads to customer frustration and which gives customers a feeling that they are facing a rigid, impersonal system. This results in a low score on customer satisfaction. Present IVR systems treat repeated calls in the same predefined manner without making any effort to know the background of recent calls, such as whether the customer just had a bad call experience and is retrying, or any similar dissatisfaction.

No effort is presently put toward understanding the exact need of the customer by providing the customer with the best suitable option, thus helping the customer to get desired information in lesser time, while enhancing the customer's experience.

It would therefore be advantageous to provide method and apparatus for intent prediction and proactive service offering.

SUMMARY OF THE INVENTION

An intelligent IVR system identifies a customer based on previous customer interactions. Customer intent is predicted for an ongoing interaction and personalized services are proactively offered to the customer. A self-optimizing algorithm improves intent prediction, customer identity, and customer willingness to engage and use IVR.

DETAILED DESCRIPTION OF THE INVENTION

Intent Prediction and Proactive Service Offering

Embodiments of the invention identify customers across multiple channels, predict customer intent, and proactively offer services to customers. In an embodiment, an automated speech self-service application framework uses data it persists, as well as enterprise data it accesses, to greet all customers and execute a personalized service strategy for each customer. This minimizes the duration of the interaction, reduces the cognitive effort needed by the customer during the call, and enhances the customer experience because the customer is treated as a known customer.

A further embodiment of the invention predicts the identity of the customer, or multiple possible candidate identities, along with a confidence factor for each identity prediction.

In another embodiment of the invention, the customer's intent is predicted to estimate the most likely action or actions that the customer wants to take in an ongoing interaction. Self optimization of prediction confidence scores allows the system to adjust itself on-the-fly and learn which assessment can be productively applied to the customer experience.

In another embodiment of the invention, one or more solicitations for service that are relevant to the customer current situation are proactively offered to the customer.

In yet another embodiment of the invention, customer tolerance is calculated to model how tolerant the customer is likely to be with regard to engaging with IVR automation in connection with completing previous tasks as directed by the IVR, thus establishing a behavioral foundation for assessing the value of attempting a subsequent IVR interaction.

Figure 1:
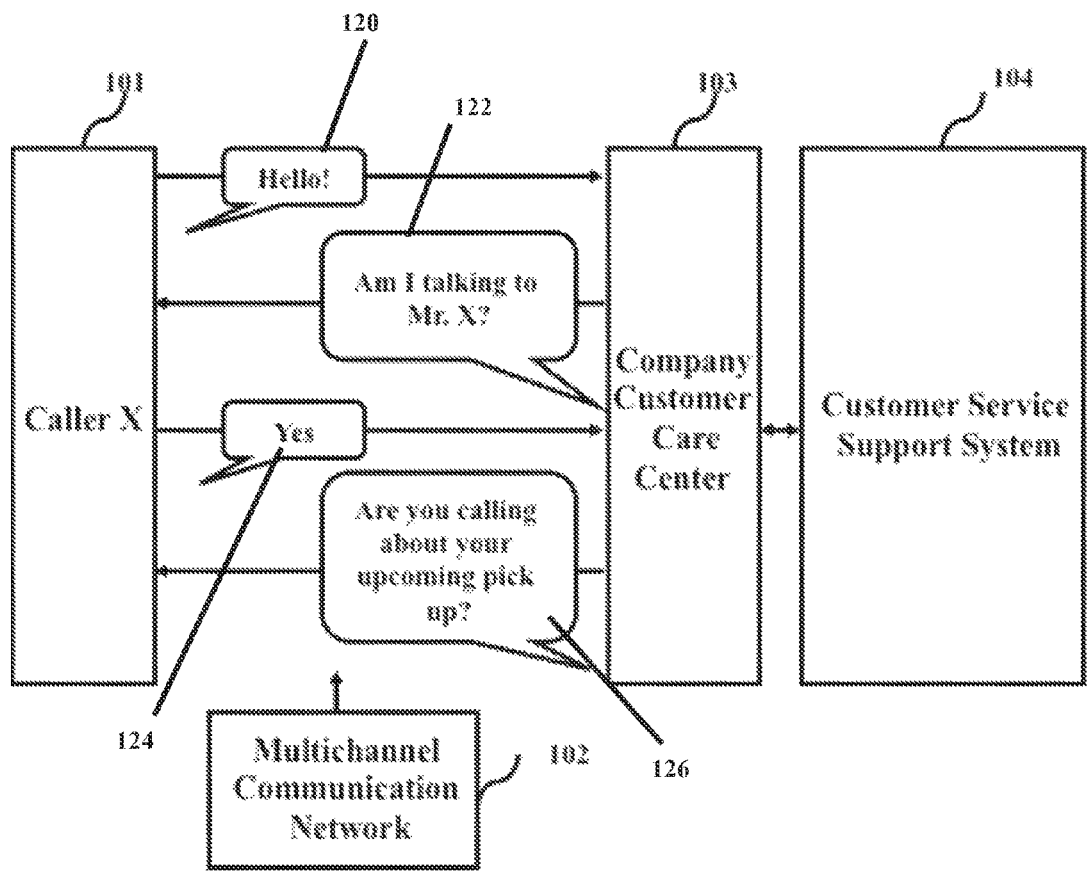
FIG. 1 is a block schematic diagram showing a system for predicting customer intent in connection with an IVR session according to the invention.

FIG. 1 is a block schematic diagram showing a system for predicting customer intent in connection with an IVR session. In FIG. 1, a caller X 101 communicates (120) via a multi channel communication network 102 with a company customer care center 103 which, in turn, communicates with a backend support system 104. The customer care center responds to the customer (122) and, upon receiving confirmation of the customer's identity (124), inquires as to the nature of the customer's interaction (126). The caller X is one among many customers who interact with the company's customer care center, each of which has a specific intention to receive a desired service or information.

The company customer care center 103 can include any of a combination of multiple customer support mechanisms, such as an IVR system, customer care executives, email support systems, SMS support systems, chat-based support systems, offline support systems, etc. Communication between the customer and the customer care center 103 may occur through a multi channel communication network 102 which may comprise any of a plurality of communication networks, such as SMS, Web, email, and outbound communication.

Figure 2:
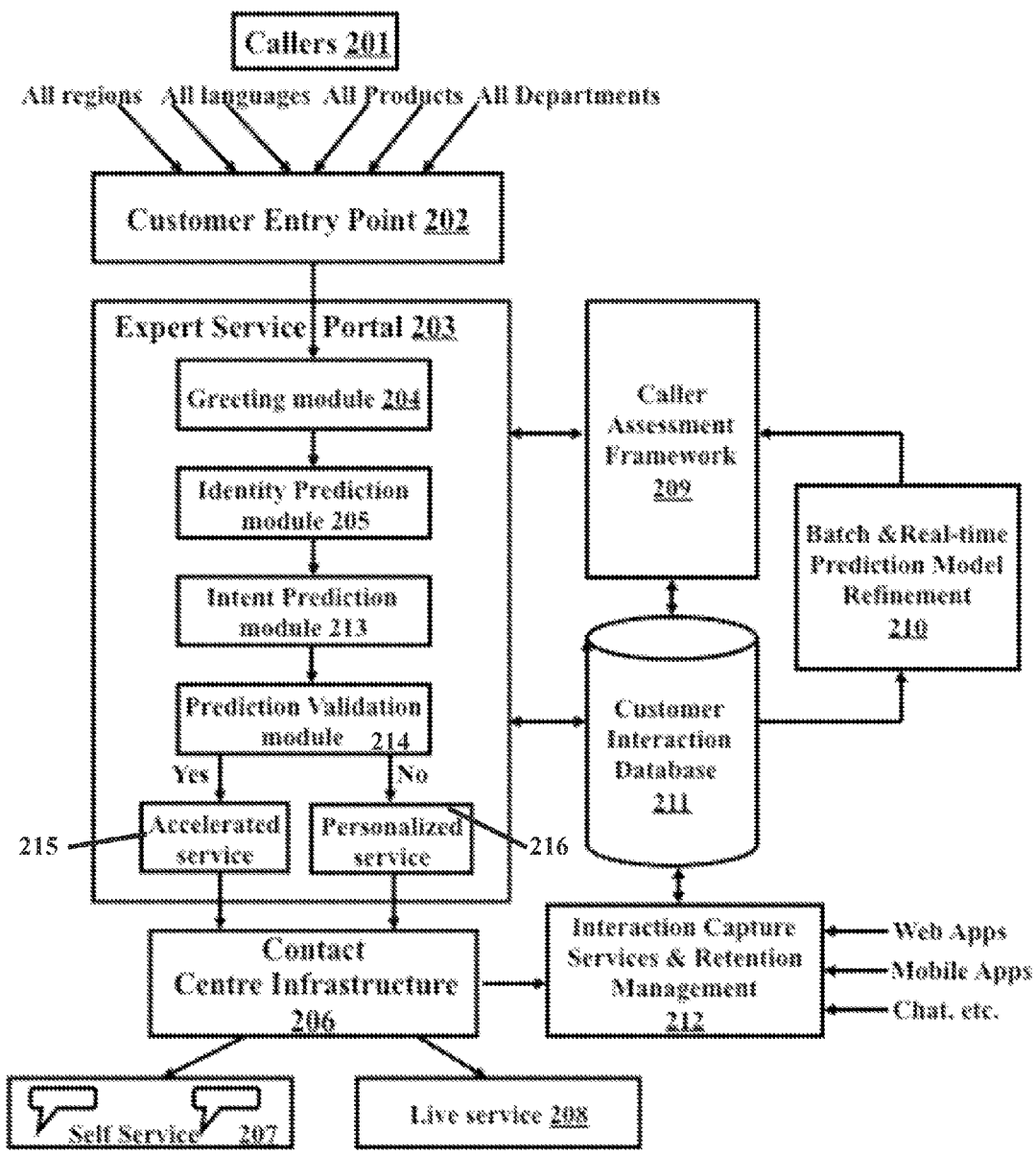
FIG. 2 is a block schematic diagram showing a system for predicting customer intent in connection with an IVR in which the logical flow of a call is shown according to the invention.

FIG. 2 is a block schematic diagram showing a system for predicting customer intent in connection with an IVR in which the logical flow of a call is shown according to the invention. The company customer care center 103 is supported by a customer service support system 104 which, in turn, comprises a plurality of logical and hardware modules, such as an expert service portal block 203, a real-time caller assessment framework 209, a customer interaction database 211 for augmenting customer data repositories, interaction capture services 212, a prediction model refinement mechanism 210, etc. These mechanisms establish an ecosystem which allows the real-time caller assessment framework and certain maintenance and data hygiene jobs in the customer interaction database to be used to make calculations within a few seconds while a generic greeting prompt, e.g. "Thanks for calling XYZ Airlines," is playing which identifies the customer, predicts the customer's intention, and minimizes the duration of the customer's interaction with the system, which thus provides enhanced customer satisfaction.

A customer entry point 202, which is in communication with the customer care center 103, interacts with customers 201 through the multi channel communication network 102. A customer 201 can be associated with different languages, regions, products, departments, etc. Interaction by a customer 201 with the customer entry point 202 is transferred to the expert service portal (ESP) 203. A greeting module 204, which is part of the ESP 203, welcomes the customer 201 and simultaneously tries to identify the customer by using the incoming phone number if the customer has interacted with the system over phone or by SMS; if, however, the customer has interacted with the system via email or offline support, then an email ID is used by the greeting module 204 to identify the customer.

Apart from identifying the customer, the greeting module determines a confidence score based on multiple factors, such as a history of previous access by the customer, previous success rate in identifying the customer, customer care executive input from an agent who interacted with a previous communication from the same phone number or email ID, an explicit opt-in action by customer that identifies the customer every time that the customer calls from the same number, call history from the same phone number, etc.

The confidence score is calculated by using a mathematical function that adds all of the scores corresponding to positive influences and subtracting from the result the scores that correspond to negative influences. For an example of how this might manifest, an event such as the customer's phone number being unique in the database is a positive event and has a corresponding score of two points. On the other hand, an event such as the same phone number looking up records of two different individuals is a negative event and can result in a subtraction of two points from the confidence score. Once the resultant confidence score goes up due to this algorithm, and crosses a predefined threshold, the caller's identity confidence is considered to be stronger. For example, the caller can move from being a low confidence caller to a medium confidence caller if the score goes above five points. The exact positive and negative influences of events on the score are tunable parameters that can be easily changed without interruption of the operations of the system. Those skilled in the art will appreciate that other values may be assigned for positive and negative influences as deemed appropriate.

In one embodiment of the invention, an identity confidence scoring mechanism develops and manages a storage mechanism in the customer interaction database 211 that contains unrestricted, many-to-many relationships between a phone number and customer IDs. This mechanism allows the correlation of a name with an ID to evolve on a continuous or discrete scale, based on inputs observed by the system, i.e. incidents. As described above, incidents are events that trigger a positive or negative impact on the confidence score calculation. This mechanism also addresses the case where phone numbers are shared by multiple customers through the use of parallel scoring and assessment of multiple IDs for an interaction, and by selective application of either an interactive disambiguation process or a sense of a personalized interaction with both identities under certain approved conditions, e.g. husband and wife, known cohabitants, etc.

If the identity confidence score is low and ambiguity exists about the customer's identity, then an identification step is performed by asking the customer his identity directly using one of a set of predefined identification data collection approaches, such as single confirmation, e.g. "Is this James calling?"; double confirmation, e.g. "Is this either Maria or James calling?"; short list disambiguation, e.g. "Who is calling?"; or full name capture, e.g. "Please tell me your name." If the confidence score is high, then the identify module determines the customer's identity using an identity prediction module 205 and further confirms the customer's identity based upon the customer's response to the determination. In one embodiment of the invention, the identification module uses the outcome of the current determination to further impact the confidence score in future interactions with customers having the same identity, e.g. the same phone number or email ID. In this way, the system learns over time from past interactions and improves the accuracy of the confidence score.

After the customer confirms his identity, the intent prediction module 213 uses multiple data sources to contribute to the prediction of the intent of the customer for the current interaction, as well as to offer services or promotions to the customer based on predictions made by the intent prediction module.

Such multiple data sources can include any of:
Recent transactions of calls received from the same number;
Recent SMS communications from the same number;
Recent email communications with the same customer;
Recent Web browsing and mobile devices applications sessions;
Trends and patterns of all inbound and outbound phone communications with the likely identity of the customer; and
Use of information recorded about interactions in non-phone channels, such as the call center agent, Web site, mobile application, store, direct mail, etc.

The intent prediction module helps reduce customer interaction time with the customer care center, offers personalized services, and improves customer satisfaction by exhibiting an overall sensitivity to the context of the call.

Predictions from the intent prediction module are validated using a prediction validation module 214. The caller may be asked a proactive question to capture intent, such as "Are you calling to about your upcoming trip to Boston?" If the caller says "Yes" and accepts this proactive intent, it is recorded in the database as a positive validation of the intent prediction algorithm. Thus, in one embodiment of the invention the intent prediction module not only predicts the intent of the customer, but also predicts many other aspects of the call, such as whether the customer should be provided with accelerated service 215, if the intent prediction is validated to a sufficient level of confidence, or personalized service 216, if the intent prediction is not validated to a sufficient level of confidence. This technique helps determine the optimal strategy to apply, for example via any of a contact center infrastructure 206 that invokes a self service module 207 or live service 208, e.g. for sales or services; customer interaction language; the product that customer is looking for or recently bought, e.g. car, truck, hotel; type of customer, e.g. general customer, high value customer, agent; best style to address the customer, e.g. expert, normal, verbose; next steps in the business process; etc. All of these predicted aspects are considered when devising a services strategy for the customer.

In one embodiment of the invention, the prediction model refinement module 210 implements a closed-loop prediction optimization algorithm that learns the combination of factors which most accurately predict the actual activity on an interaction. The prediction algorithm works on several data points to make the intent prediction result in a proactive offer to the caller. The data points include, for example, current activity on the client file, such as recent reservation, data from the company's CRM database, etc. In a situation where multiple intents are possible, the algorithm decides on the most likely intent based on these data points and the order in which they are to be considered.

The intent prediction module also performs a self-monitoring of the performance of the mechanism by regularly calculating a customer assessment success rate, i.e. the percentage of times a customer assessment is completed in its entirety before the conclusion of an assessment period, where the assessment period denotes the maximum amount of time available at the start of a customer interaction before the prediction results are no longer valuable.

Disparate events, either in the IVR or outside the IVR, are considered in proportion to their predictive power. When weighing such different events for a caller C, for example C had rented a car and returned it about two weeks ago (which predicts the possible desire for a receipt for C's expense report) and C requested roadside assistance one hour ago for a different rental car (which predicts additional roadside support), the relative predictive power of each of these events is evaluated using the algorithm. Positive points are awarded to factors, such as recentness of events, and negative points may be awarded to events which may not have happened recently. In the above example, the request for roadside assistance is regarded as more likely due to this evaluation, as well as the sensitive nature of potentially still having a customer stranded on the side of the road.

In one example, a customer has made a flight ticket booking in the recent past, e.g. within the last 15 days. The intent prediction module predicts that the customer's interaction relates to an inquiry about the flight and checks with the customer to see if the customer is, indeed, looking for flight ticket status.

In another example, if the intent prediction module finds data related to the customer, e.g. the customer owns a house, and if the intent prediction module predicted that the customer's current interaction intent is related to house equipment, then the system proactively offers products or services which are relevant to the customer during the current intention, e.g. insurance for the house.

In another example, if the intent prediction module finds that the customer has booked a lodging in a hotel for today's date, then offering another hotel accommodation is irrelevant. This leads the Intent prediction module to remove this kind of promotion so that customer is not annoyed by intrusive and useless information, thereby increasing customer satisfaction.

In one embodiment of the invention, the intent confidence score is also used for intent prediction and, depending on the confidence score and the intent of the customer, the system creates a services strategy for the customer, for example by directing the customer to a self help system, sending an SMS to the customer's mobile number with the necessary information that the customer is looking for, sending an email to the customer with information that customer is looking for, passing the customer to a customer care executive, directing the customer to chat support, asking the customer to go to a self help portal, scheduling a call back to the customer, etc. The system treats each customer with specialized services based on the current intent of the customer, rather than treating all customers with same standard series of menus, or treating each customer in similar way every time they interact with the system. This improves customer satisfaction and reduces the cost to a company of servicing a customer because at least some of the customer's issues are addressed without involving a customer care executive.

Embodiments of the invention also calculate caller tolerance, i.e. how tolerant the customer is likely to be to the use of IVR automation on this interaction, based on computing scores for:

(a) Prior customer efforts to use the IVR system; and
(b) Recent success rates in using the IVR system.

The assessment of the caller's tolerance for automation is based on the calculation of a score that incorporates the effect of positive and negative effects. For example, if a caller does not request the assistance of an operator, even after multiple instances of caller difficulty, it is considered a positive influence on the tolerance score. However, if a caller immediately requests operator assistance when the caller faces the first speech recognition issue, it is considered a negative influence.

In one embodiment of the invention, a customer can set certain preferences, such as permanent opt-in to, and/or opt-out of, the customer assessment and recognition process; temporary exclusion on a per interaction basis from the customer assessment and recognition process; one or more proffered spoken languages or language variants to be used on future interactions; etc. These preferences can be set by either using a Web application, native mobile application, or other GUI-based tool where the caller can express them explicitly outside the context of a call or via the speech application that includes preference questions in the call flow.

In one embodiment of the invention, a single cross-enterprise mechanism that is managed centrally via a Web portal is used to provide a customer experience that varies on many different incoming lines for anonymous customers. Variations that may be configured include playing of branding messages, announcement of delivery, primary interaction language, secondary language options for callers, menu options, association with a line of products or services, and identifying a task that the customer is expected to perform during interaction.

Figure 3A:
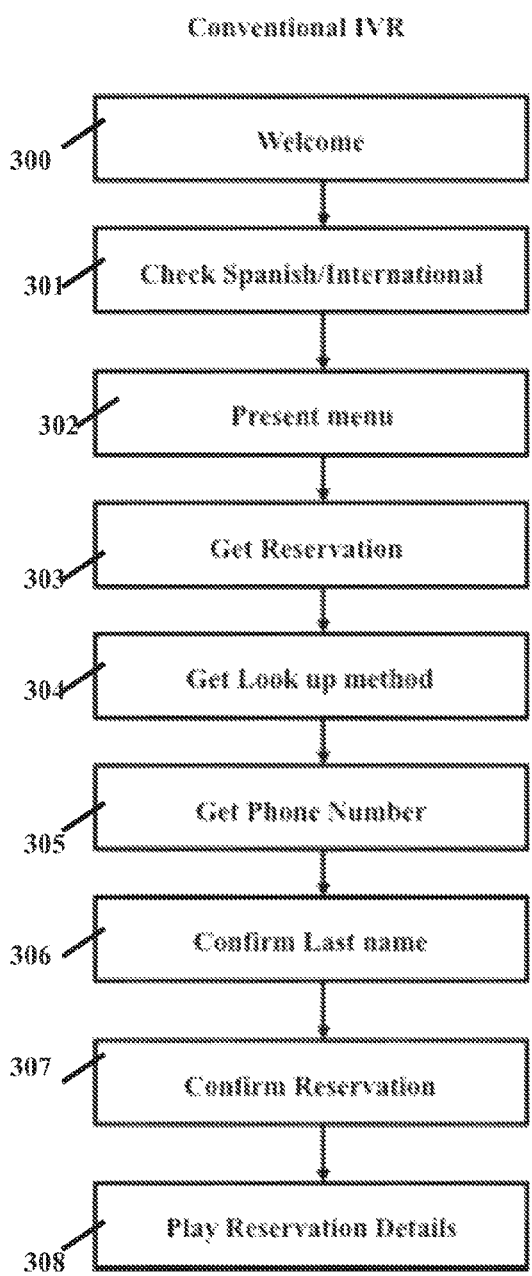
FIGS. 3A and 3B are flow diagrams that show a comparison between a conventional IVR system (FIG. 3A) and an intelligent IVR system according to the invention (FIG. 3B)
Figure 3B:
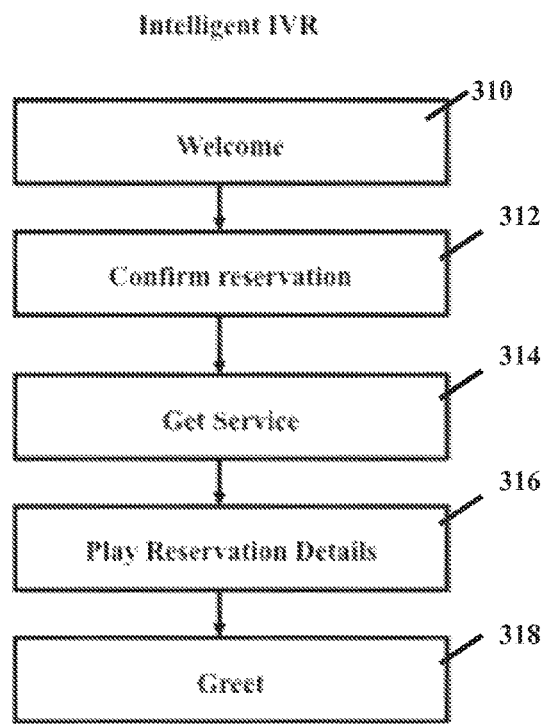

FIGS. 3A and 3B are flow diagrams that show a comparison between a conventional IVR system (FIG. 3A) and an intelligent IVR system according to the invention (FIG. 3B). The flow diagram shows an illustrative example and should not be considered to be limiting with regard to the scope of the invention. The comparison shows a general execution of personalized service strategy for each customer, which minimizes the duration of the interaction, and the cognitive effort needed by the customer during the call and the enhanced customer experience provided by an embodiment of the invention when compared to a conventional IVR system.

In a conventional IVR system, the customer is greeted (300) and then asked which language the customer wants to use when interacting with the system (301). A series of menus are then presented (302), from which customer selects the desired services. In the example shown in FIG. 3A, the desired services are related to the reservations that the customer has made (303). The system collects the tracking number from the customer, and then collects other details that may be used to look up the customer's information (304), such as the customer's phone number (305), and to validate the customer, such as the customer's last name (306). The system then confirms the reservations (307) and plays details to the customer (308).

In contrast thereto, the intelligent IVR greets the customer (310) and simultaneously identifies the customer and predicts the intent of the customer for this interaction. The system then confirms the reservation (312), gets the service (314), and plays the reservation to the customer (316). The use of confidence calculations, in effect, allows the intelligent IVR to make presumptions that a conventional IVR can not make due to its "one size fits all" approach. As a result, the intelligent IVR approach reduces both the time expended, perceived effort on the caller's part, and costs related to connection time for both the customer's telephony carrier and the toll-free carrier serving the enterprise that is supported by the intelligent IVR.

Computer Implementation

Figure 4:
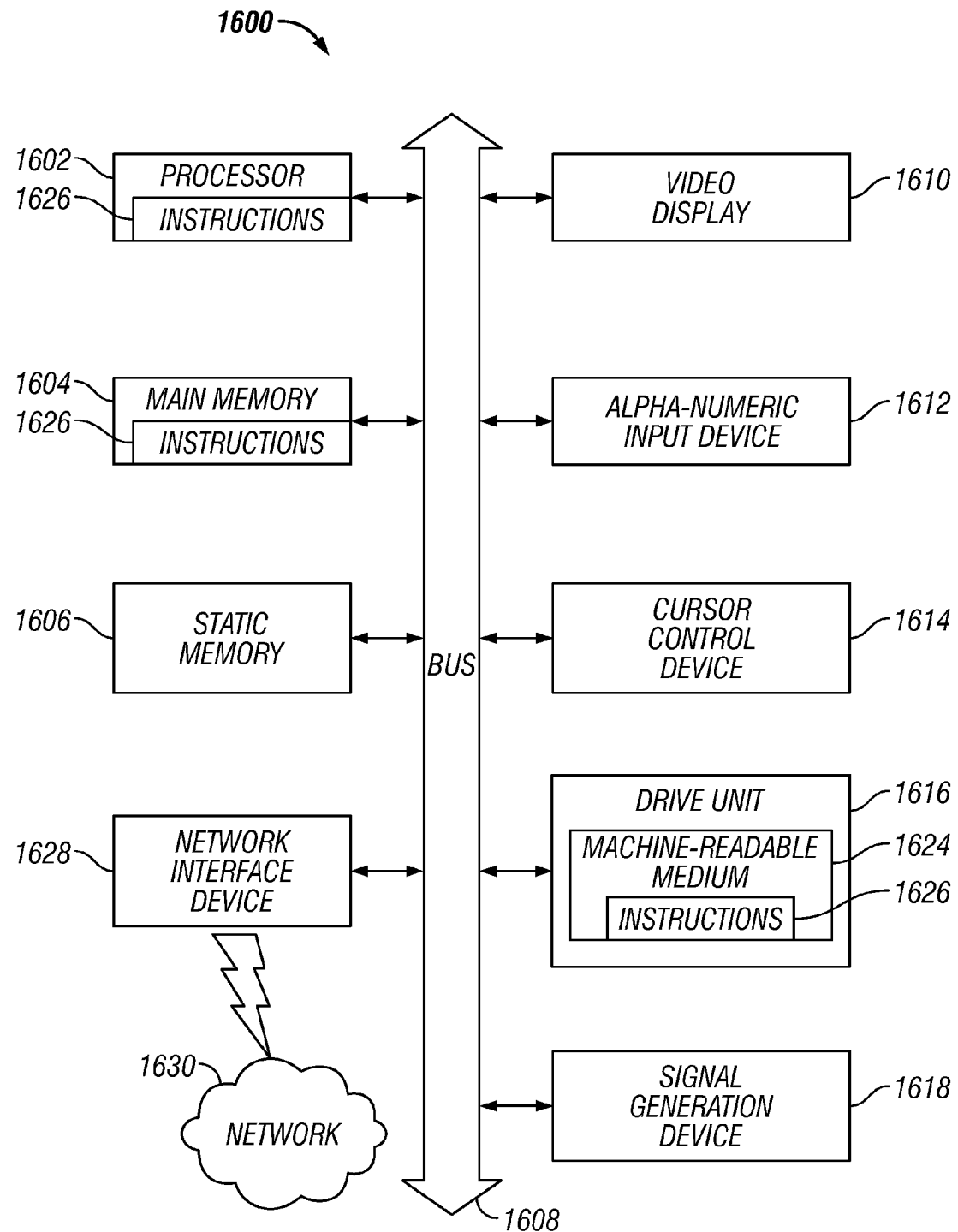
FIG. 4 is a block schematic diagram that depicts a machine in the exemplary form of a computer system within which a set of instructions for causing the machine to perform any of the herein disclosed methodologies may be executed.

FIG. 4 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604, and a static memory 1606, which communicate with each other via a bus 1608. The computer system 1600 may further include a display unit 1610, for example, a liquid crystal display (LCD). The computer system also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC). Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core, such as the CPU of a computer, or otherwise implemented or realized upon or within a machine or computer readable medium. A machine-readable medium includes any mechanism for storing or transmitting information in a form readable by a machine, e.g.

a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for identifying customers across multiple channels, predicting customer intent, and proactively offering services to customers, comprising:
a processor implemented automated speech self-service application framework using any of data that said framework persists, data persisted by other non-IVR interaction channels, which data persisted by non-IVR channels comprises any of recent Web page history and chat transcript contents, and enterprise data that said framework accesses, to greet customers and execute a personalized service strategy for each customer;
said framework predicting the identity, or multiple possible candidate identities, of each customer; and
said framework further comprising an intent prediction module configured to perform performance self-monitoring by regularly calculating a customer assessment success rate which comprises a percentage of times a customer assessment is completed in its entirety before conclusion of an assessment period, where the assessment period denotes a maximum amount of time available at the start of a customer interaction before prediction results are no longer valuable.

2. The method of claim 1, further comprising:
said framework generating a self optimizing confidence factor for each identity prediction that is adjustable after each interaction.

3. The method of claim 1, further comprising:
said framework predicting each customer's intent to estimate a most likely action or actions that said customer intends to take in an ongoing interaction; and
said framework applying a self optimizing prediction confidence score to adjust said predicted customer intent on-the-fly and determine which assessment is most productively applied to the customer's interaction.

4. The method of claim 1, further comprising:
said framework proactively offering to the customer any of at least one solicitation for service that is relevant to said customer's current interaction and a desired business outcome.

5. The method of claim 1, further comprising:
said framework calculating a customer tolerance score that models how tolerant the customer is likely to be with regard to the use of IVR automation in general or in connection with a specific type of customer interaction.

6. A system for predicting customer intent in connection with an IVR session, comprising:
a customer care center in communication with a customer via a multichannel communication network;
said customer care center configured for responding to a customer interaction and, upon receiving confirmation of said customer's identity, predicting the intent of said customer's interaction;

wherein said customer comprises one among many customers who interact with said customer care center, each of which has a specific intention to receive a desired service or information; and said customer care center further comprising an intent prediction module configured to perform performance self-monitoring by regularly calculating a customer assessment success rate which comprises a percentage of times a customer assessment is completed in its entirety before conclusion of an assessment period, where the assessment period denotes a maximum amount of time available at the start of a customer interaction before prediction results are no longer valuable.

7. The system of claim 6, said customer care center comprising any one or more of a combination of multiple customer support mechanisms which comprise any of an IVR system, one or more customer care executives, a Web site, an email support system, an SMS support system, a chat-based support system, one or more native mobile applications for a phone or tablet, and one or more offline support systems.

8. The system of claim 6, said multichannel communication network comprising any one or more of a plurality of communication networks which comprise any of SMS, Web, email, mobile and outbound networks.

9. The system of claim 6, said customer care center further comprising:
a customer service support system comprising an expert service portal (ESP) block, a real-time caller assessment framework, a customer interaction database for augmenting customer data repositories, interaction capture services, and a prediction model refinement mechanism each of which, alone or in combination, identifies said customer, predicts customer intention, calculates propensities for specific customer behaviors to be successfully elicited, and minimizes duration of customer interaction with said system.

10. The system of claim 6, said customer care center further comprising:
a customer entry point, in communication with said customer care center, for interacting with customers through said multichannel communication network, wherein said customer is associated with any of different languages, regions, products, and departments.

11. The system of claim 6, said customer care center further comprising:
in response to interaction by said customer with a customer entry point, an expert service portal (ESP) comprising a greeting module for welcoming said customer and simultaneously identifying said customer based upon an incoming phone number when customer interaction is over phone or by SMS, based upon a username when the interaction is on the Web or in a mobile application, and based upon an email ID when customer interaction is via email or offline support.

12. The system of claim 11, said greeting module further comprising:
a mechanism that determines a confidence score based on multiple factors comprising any of a history of previous access by said customer, previous success rate in identifying said customer, customer care executive input from an agent who interacted with a previous communication from a same phone number or email ID, an explicit opt-in action by said customer that identifies the customer every time that the customer calls from the same number, and call history from the same phone number.

13. The system of claim 6, said customer care center further comprising:
an identity confidence scoring mechanism for developing and managing a storage mechanism in a customer interaction database that contains unrestricted, many-to-many relationships between a phone number and customer IDs, said identity confidence scoring mechanism correlating a name with an ID to evolve on a continuous or discrete scale, based on inputs observed by the system.

14. The system of claim 13, said identity confidence scoring mechanism further comprising:
a mechanism that addresses phone numbers that are shared by multiple customers by using parallel scoring and assessment of multiple customer IDs for an interaction, and by selectively applying either an interactive disambiguation process or a sense of a personalized interaction with multiple identities under approved conditions.

15. The system of claim 6, said customer care center further comprising:
when an identity confidence score is low and ambiguity exists about a customer's identity, an identity module that performs an identity check by asking said customer about the customer's identity directly; and
when an identity confidence score is high, said identify module guessing a customer's identity using an identity prediction module and confirming said customer's identity based upon said customer's response to said guess.

16. The system of claim 15, further comprising:
said identify module configured to use an outcome of a current guess to determine a confidence score in future interactions with customers having the same identity.

17. The system of claim 6, said customer care center further comprising:
after a customer's identity is confirmed, an intent prediction module configured to use multiple data sources to contribute to prediction of customer intent for a current interaction.

18. The system of claim 17, said multiple data sources comprising any of:
recent transactions of calls received from a same number;
recent SMS communications from a same number;
recent email communications with the same customer;
recent web browsing and mobile devices applications sessions;
trends and patterns of all inbound and outbound phone communications with the likely identity of the customer; and
use of information recorded about interactions in non-phone channels, including any of a call center agent, web site, mobile application, store, and direct mail.

19. The system of claim 6, said customer care center further comprising:
an intent prediction module for predicting said customer intent; and
a prediction validation module for validating predictions from said intent prediction module.

20. The system of claim 19, further comprising:
said intent prediction module configured to predict any of whether the customer should be provided with accelerated service when an intent prediction is validated to a predetermined level of confidence, and whether the customer should be provided with personalized service when an intent prediction is not validated to a predetermined level of confidence.

21. The system of claim 6, said customer care center further comprising:

in response to said prediction, a mechanism configured for determining an optimal strategy to apply to said customer interaction via any of:
- a contact center infrastructure that invokes a self service module or live service for sales or services;
- customer interaction language;
- a product or service that a customer is looking for or recently bought;
- a type of customer;
- a best style to address the customer; and
- next steps in a business process.

22. The system of claim 6, said customer care center further comprising:
- a prediction model refinement module configured to implement a closed-loop prediction optimization algorithm for learning a combination of factors which most accurately predict actual activity during a customer interaction.

23. The system of claim 6, said customer care center further comprising:
- a prediction module configured for using an intent confidence score for intent prediction and, depending on a confidence score and intent of the customer, for creating a service strategy.

24. The system of claim 23, wherein said service strategy comprises any of:
- directing the customer to a self help system;
- sending an SMS to the customer's mobile number with necessary information that the customer is looking for;
- sending an email to the customer with information that customer is looking for;
- passing the customer to a customer care executive;
- directing the customer to chat support;
- asking the customer to go to a self help portal; and
- scheduling a call back to the customer.

25. The system of claim 6, said customer care center further comprising:
- a module configured for calculating caller tolerance to the use of IVR automation on an interaction, based on computing scores for prior customer effort levels to use an IVR system and recent success rates in using an IVR system.

26. The system of claim 6, further comprising:
- a customer preferences dialog comprising any of:
    - permanent opt-in to, and/or opt-out of a customer assessment and recognition process;
    - temporary exclusion on a per interaction basis from the customer assessment and recognition process; and
    - one or more proffered spoken languages or language variants to be used on future interactions.

27. The system of claim 6, further comprising:
- a single cross-enterprise mechanism managed centrally via a web portal and configured to provide a customer experience that varies according to any of:
    - playing of branding messages;
    - announcement of delivery;
    - primary interaction language;
    - secondary language options for callers;
    - menu options;
    - association with a line of products or services; and
    - identifying a task that the customer is expected to perform during a customer interaction.

28. The system of claim 25, further comprising:
- computing said scores based upon customer effort levels and success rates earlier in a current call.

* * * * *